United States Patent
Fujii et al.

(10) Patent No.: US 7,147,456 B2
(45) Date of Patent: Dec. 12, 2006

(54) MOLD DEVICE HAVING A COMBINATION OF MOLDS FOR STRETCH BLOW MOLDING

(75) Inventors: Daigo Fujii, Nagano-ken (JP); Takekazu Mochizuki, Nagano-ken (JP)

(73) Assignee: A.K. Technical Laboratory, Inc., Nagano-ken (JP)

( * ) Notice: Subject to any disclaimer, the term of this patent is extended or adjusted under 35 U.S.C. 154(b) by 339 days.

(21) Appl. No.: 10/926,281

(22) Filed: Aug. 25, 2004

(65) Prior Publication Data

US 2005/0058741 A1    Mar. 17, 2005

(30) Foreign Application Priority Data

Aug. 26, 2003    (JP)  .............................. 2003-208846

(51) Int. Cl.
*B29C 49/18*    (2006.01)

(52) U.S. Cl. ...................... 425/530; 425/541

(58) Field of Classification Search ................ 425/529, 425/530, 541; 264/529, 530; *B29C 49/16, B29C 49/18*

See application file for complete search history.

(56) References Cited

U.S. PATENT DOCUMENTS

| | | | |
|---|---|---|---|
| 2,913,762 A | * | 11/1959 | Knowles ..................... 425/541 |
| 2,974,362 A | * | 3/1961 | Knowles ..................... 425/541 |
| 3,002,225 A | * | 10/1961 | Goller ......................... 425/526 |
| 3,441,982 A | * | 5/1969 | Tsukahara et al. ........... 425/541 |
| 3,753,641 A | * | 8/1973 | Turner et al. ................ 425/541 |
| 3,809,517 A | * | 5/1974 | Schneider .................... 425/541 |
| 3,850,562 A | * | 11/1974 | Takeuchi et al. ............. 425/529 |
| 3,936,260 A | * | 2/1976 | Farrell ......................... 425/529 |
| 4,726,756 A | | 2/1988 | Aoki ........................... 425/526 |
| 5,635,226 A | | 6/1997 | Koda et al. |
| 6,026,980 A | | 2/2000 | Malik et al. |

FOREIGN PATENT DOCUMENTS

| | | |
|---|---|---|
| GB | 2 126 156 | 3/1984 |
| JP | 59-002818 | 1/1984 |
| JP | 04-133715 | 5/1992 |
| JP | 04-336237 | 11/1992 |

* cited by examiner

*Primary Examiner*—Robert B. Davis
(74) *Attorney, Agent, or Firm*—Weingarten, Schurgin, Gagnebin & Lebovici LLP

(57) ABSTRACT

The present invention relates to a mold device having a combination of molds for stretch blow molding, comprising a main blow mold 5, installed on a pair of platens 2 by being separated into split molds 5a, a pre-blow mold 10, attached to a lifting device 11 under the area between the split molds 5a, and movable in and out from the area between the split mold 5a, a neck mold 7, which is fitted into the pre-blow mold 10 and main blow mold 5 respectively, a blow core 20, which is fitted in to the neck mold 7, and a stretch rod. The pre-blow mold 10 comprises a cylindrical member having an open end on the upper portion, which is fitted into the neck mold 7. A bottom mold 8 of the main blow mold 5 is installed in the bottom portion of the split mold 5a by being separated into split bottom molds 8a. Lifting cylinders 9 are placed under the both of the split bottom molds 8a in order to make the bottom mold 8 movable in and out from the bottom portion of a cavity.

4 Claims, 7 Drawing Sheets

MOLD DEVICE HAVING A COMBINATION OF MOLDS FOR STRETCH BLOW MOLDING

This application claims priority to a Japanese application No. 2003-208846 filed Aug. 26, 2003.

BACKGROUND OF THE INVENTION

1. Field of the Invention

The present invention relates to a mold device having a combination of molds for stretch blow molding, comprising a main blow cavity, which is for molding a container such as a plastic bottle, and a pre-blow mold below, and pre-blow molding and main blow molding are operated at a same position.

2. Background Art

A conventional art discloses a mold device having a combination of molds which uses a pair of split pre-blow molds, which can be opened and closed on a bed by a mold clamping device, and a pair of main blow molds, placed under the pre-blow molds which is movable upward and downward, and the main blow molds can be clamped with the pre-blow molds by the clamping device (reference patent: U.S. Pat. No. 5,635,226).

The conventional device disclosed in U.S. Pat. No. 5,635,226 uses a pair of split molds for a pre-blow mold, so that a parting line is left on a preliminary article formed in pre-blow molding, and also another parting line is marked on the same location by main blow molds. Consequently, the longitudinal convex parting line becomes more exaggerated than a parting line on a bottle, which doesn't require pre-blow molding, so it often affects the appearance of the bottle or causes a problem for labeling.

Moreover, because the pre-blow molds and the main blow molds share a common clamping device to be closed, the number of clamping operation increases comparing to the clamping process in blow molding without pre-blow molding. The stroke of the pre-blow molds is set longer in order to insert the main blow molds between the pre-blow mold halves at opening state, and as an evitable result, the length of a ram for the mold clamping device has to be long. It takes a long time to open or close the main blow molds, and it causes a delay in the molding cycle time including the increase of the number of clamping action.

Furthermore, since the main blow molds are clamped with the pre-blow molds, the pre-blow molds have to be as large as the main blow molds irrelevantly to the substantial requirement for the pre-blow molding even in the pre-blow molding process wherein the preform is stretch blow molded by a little because the pre-blow molds have to be able to press the whole main blow molds. Besides, the main blow molds can't be opened by itself, so it requires an apparatus for opening the main blow mold with the backward movement of the mold clamping device. Consequently, the blow molding device tends to be complicated and large.

The problem of the blow mold device mentioned above can't be solved by changing the position of the molds by placing the main blow molds on the bed and the pre-blow molds under the main blow molds as long as a pair of split molds is adopted for the pre-blow molds. Also, if the pre-blow molds are movable between the split main blow mold halves, it is difficult to place a bottom mold for the main blow mold, and the usage of the main blow mold is limited to a mold for a container having a flat bottom, which is removable with the opening by the main blow mold.

SUMMARY OF THE INVENTION

The present invention is to solve the problem of the conventional blow mold device mentioned above. The object is to provide a novel mold device having a combination of molds for stretch blow molding which prevents the parting line created in pre-blow molding by using a cylindrical pre-blow mold, and even if the pre-blow mold is movable between the main blow mold halves placed on the bed, the mold clamping device for the main blow mold doesn't have to clamp the pre-blow mold, and a bottom mold can be equipped.

The present invention relates to a mold device having a combination of molds for stretch blow molding, comprising; a pair of platens, facing towards each other, attached to a mold clamping device on a bed, and being movable advance and retreat; a main blow mold, separated into split molds and installed inside of the platens; a lifting device, placed vertically under the main blow mold and in the bed; a pre-blow mold connected to the lifting device and movable in and out from the area between a pair of the split molds; a neck mold located above the main blow mold so as to close pre-blow mold and main blow mold respectively; a blow core being fitted into the neck mold; and a stretch rod inserted through the blow core, wherein the pre-blow mold comprises a cylindrical member, having an open end on the upper portion which close the neck mold at an end surface of the neck mold, and a bottom mold for the main blow mold is separated into a pair of split bottom molds, and the split bottom molds are attached to lifting cylinder located under and said bottom mold is movable into and away from the bottom of a cavity.

Moreover, the neck mold comprises an annular groove, provided on the end surface of the neck mold, the open end of pre-blow mold is to be fitted into the annular groove, and the end surface of the neck mold inside the annular groove forms the upper mold surface of the pre-blow mold. The main blow mold comprises a plurality of cavities placed in parallel, and the pre-blow molds, comprising same numbers of the cylindrical members as the neck molds so as to close each of the cavities respectively, are fixed in parallel on a base plate, which is tied to the upper end of a piston rod of the lifting device, and movable in and out of the area between the split molds of the main blow mold.

In the construction mentioned above, pre-blow molding can be operated by closing a neck mold and a cylindrical member, which is used as a pre-blow mold, and the pre-blow mold can be opened with moving the cylindrical member downward, so that no parting line is left on the body of the preliminary article formed in pre-blow molding. Moreover, because the size of the cylindrical member can be determined according to the level of pre-blow molding, the size of the cylindrical member won't be too large. The diameter of the cylindrical member fits within the diameter of the neck mold, so the cylindrical member can be more remarkably light and compact than the conventional split mold type, and the stroke of the main blow mold can be shorter. Therefore, the mold device can be smaller.

Since opening and closing the neck mold and the pre-blow mold are achieved by a lifting device, the mold clamping device is operated only for main blow molding. Consequently, the number of clamping operation is limited to once in a molding cycle, the time for opening and closing as the stroke becomes shorter, and no delay occurs in a molding cycle as a result.

Closing of the neck mold and the pre-blow mold is achieved by fitting the open end of the cylindrical member and the annular groove provided on the end surface of the neck mold. Thus, closing state of molds can be maintained easily by applying sufficient pressure by the lifting device to withstand the pre-blow molding pressure, and opening action can be achieved by lowering the pre-blow mold by the lifting device. Therefore, an additional mean for opening and closing the molds is not necessary.

DETAILED DESCRIPTION OF THE PREFERRED EMBODIMENT

Figure 1:
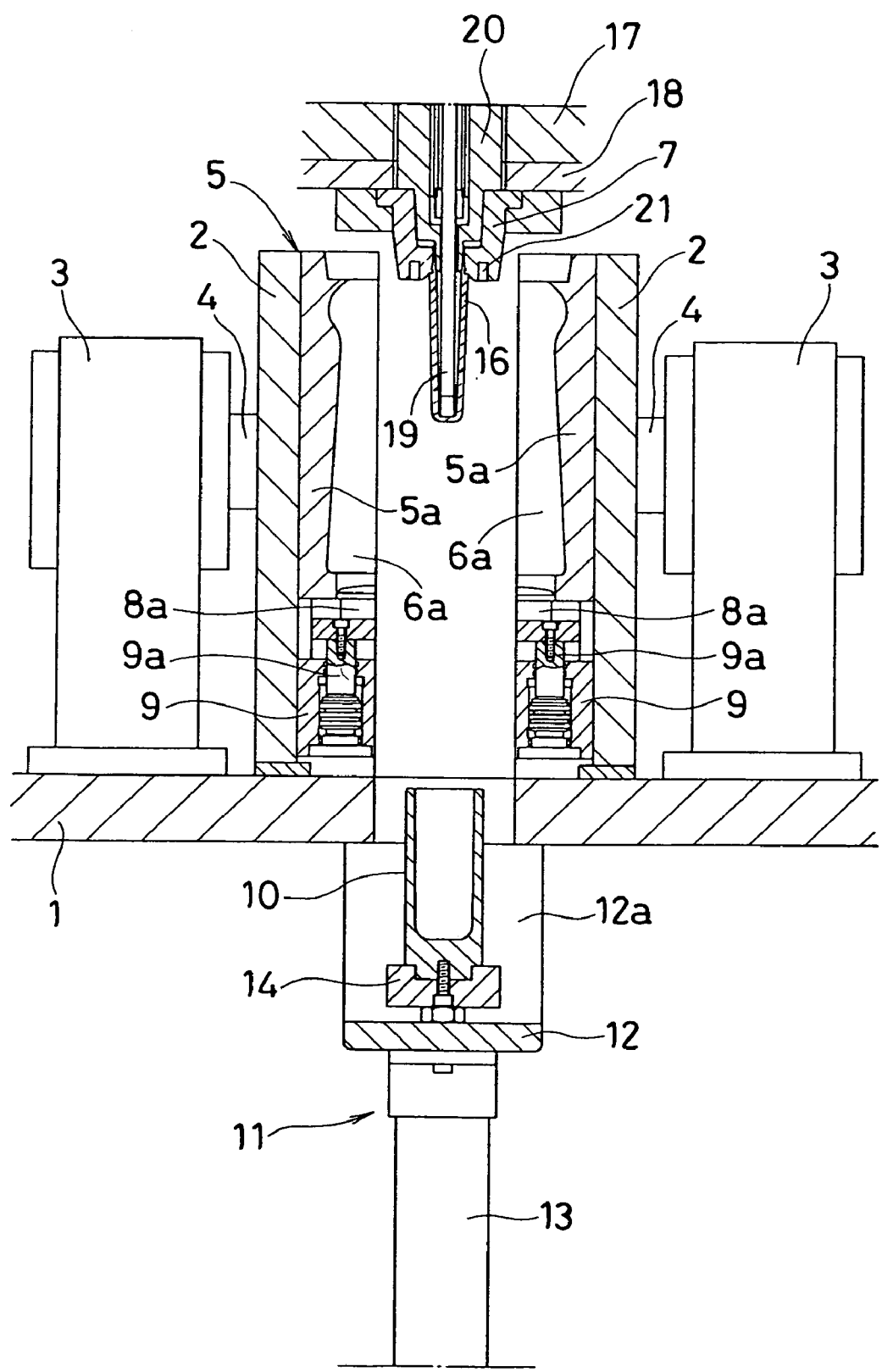
FIG. 1 is a sectional side view of a mold device having a combination of molds for stretch blow molding in an opened state according to the present invention.

As shown in FIG. 1, a pair of platen 2, 2, is movable advance and retreat facing toward each other on the top of a bed 1. Piston rods 4, 4 of mold clamping devices 3, 3 placed on the top of the bed 1 are tied to the outer surface of platens 2, 2. On the inner surface of the platens 2, 2, a main blow mold 5 for molding an article (e.g. a bottle) is installed with being separated into split molds 5a, 5a, and concave cavity halves 6a, 6a, which form a cavity 6 (see FIG. 6) by closing the mold, are fixed on the parting surface of the split molds 5a, 5a.

Upper end of the cavity halves 6a, 6a connects to open halves, which fit to a neck mold 7. In the bottom of the cavity halves 6a, 6a, a bottom mold 8 (see FIG. 6) of main blow mold 5 is separated into split bottom molds 8a, 8a, and the split molds 8a, 8a are movable upward and downward via each of piston rods 9a, 9a of lifting cylinders 9, 9 which are hydraulically or pneumatically driven under the sprit bottom molds 8a, 8a.

10 is a pre-blow mold, which comprises a cylindrical member, having an opening on the upper end, and the pre-blow mold 10 is movable in and out from the hole on the upper plate of the bed 1 under the main blow mold 5 in order to be placed between the split molds 5a, 5a of the main blow mold 5 via a lifting device 11, placed vertically under the bed 1. The lifting device 11 comprises; a supporting member 12, having arm plates 12a, 12a which is formed by bending both ends of a seat plate upwardly, and the arm plates 12a, 12a are fixed to the lower surface of the bed 1 to set the seat plate right under the center of the main blow mold 5; a lifting cylinder 13, which is hydraulically or pneumatically driven and installed in the center of the seat plate upright; a base plate 14, tied to a piston rod 13a of the lifting cylinder 13; and a pair of guide rods 15, 15, tied to the base plate 14 and inserted through guide holes located on both sides of the seat plate. The bottom of the pre-blow mold 10, mentioned above, is installed on the base plate 14 with bolts and placed vertically with facing upward.

The neck mold 7, mentioned above, comprises a pair of split molds movable so as to make opening and closing action towards the same direction as the main blow mold 5, and attached to the lower surface of a transfer plate 18 under a support platen 17. The neck mold 7 includes normal functions such as; a mold for forming a neck portion of a preform 16 with an injection mold, which is not shown on the figures; a retaining member for transferring the preform 16 from the injection mold to the main blow mold 5; a retaining member for transferring a bottle 23 to another point, and a blow core 20, having a stretch rod 19 inserted, fits inside of the neck mold 7 from above in a stretch blow molding process. The neck mold 7 also includes an annular groove 21, which the open end on the upper portion of the pre-blow mold 10 is fitted into, on the lower end surface. The lower end surface inside the annular groove 21 forms the upper mold surface of the pre-blow mold 10.

According to the embodiments in the figures, a plurality of concave cavity halves 6a, 6a are formed in parallel on each of the split molds 5a, 5a of the main mold 5 mentioned above, and closing the split molds 5a, 5a forms a plurality of cavities 6, 6 at the same time. Same number of the cylindrical pre-blow molds 10, 10 as afore mentioned neck molds 7, 7, which is fitted into a plurality of the cavities 6, 6 respectively, are placed and fixed on the base plate 14, tied to the upper end of the piston rod 13a of the lifting device 11 mentioned above, and the pre-blow molds 10, 10 are movable in and out from the area between the split molds 5a, 5a of main blow mold 5 in order to stretch blow mold a plurality of bottles 23 at the same time.

The pre-blow mold 10 comprises the cylindrical member, having the outside diameter within the diameter of the neck mold 7, and when the pre-blow mold 10 is closed with the neck mold 7, the bottom of the preform 16 touches the inner surface of the bottom of the cylindrical member not to change the length of the preform in the pre-blow molding process. However, if it is necessary to stretch the preform in the pre-blow molding process, a cylindrical member having a depth including the stretching dimension may be used.

Figure 2:
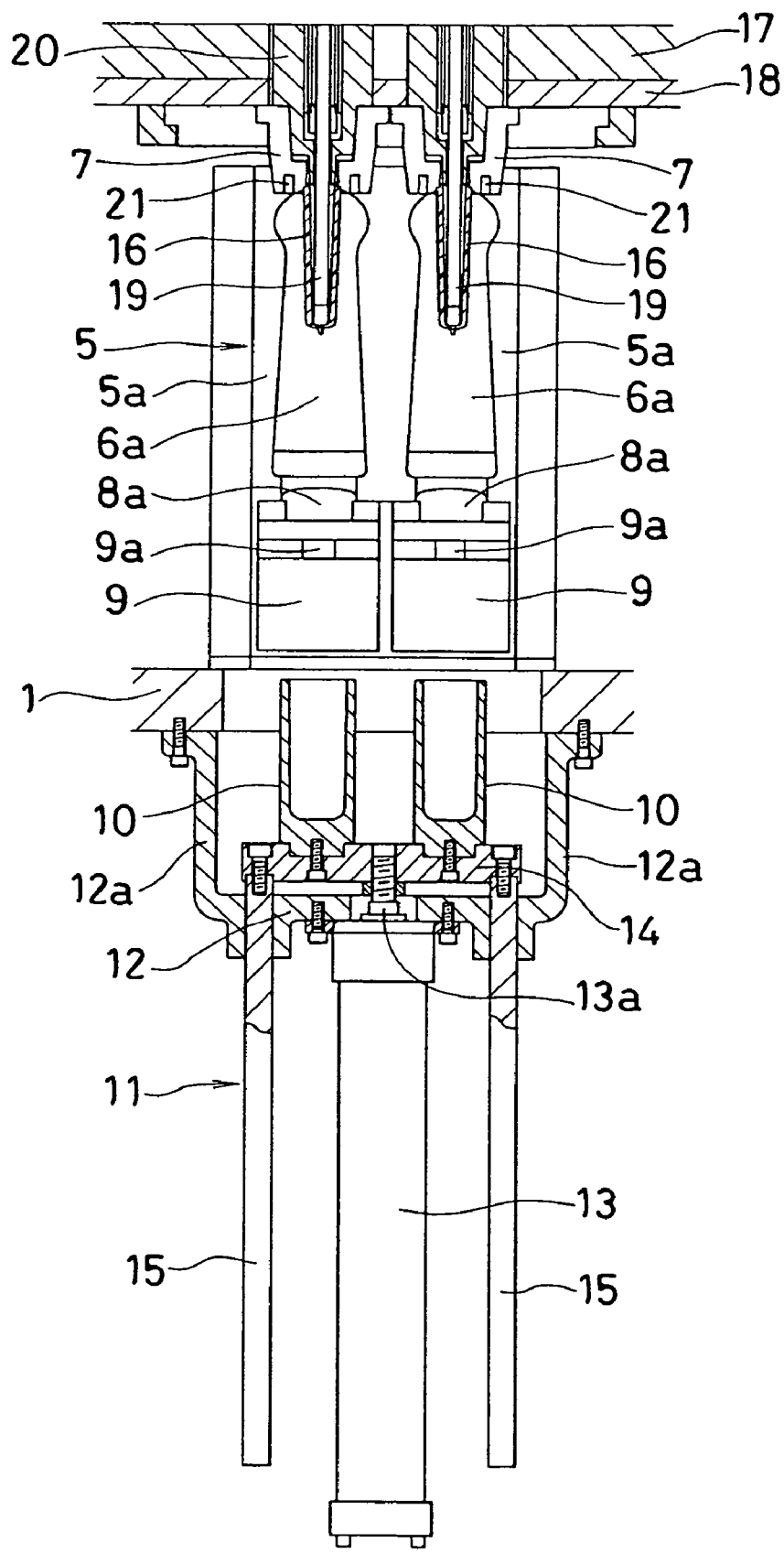
FIG. 2 is a sectional front view of the mold device in FIG. 1.

In the construction of the combination of molds as shown in FIG. 1 and FIG. 2, when the main blow mold 5 is in the opened position, the neck mold 7, retaining the preform 16, is lowered and placed to the upper area between the split molds 5a, 5a, the blow core 20 is inserted and fitted into the neck mold 7, and simultaneously, the stretch rod 19, inserted through the blow core 20, is inserted into the bottom of the preform 16.

Figure 3:
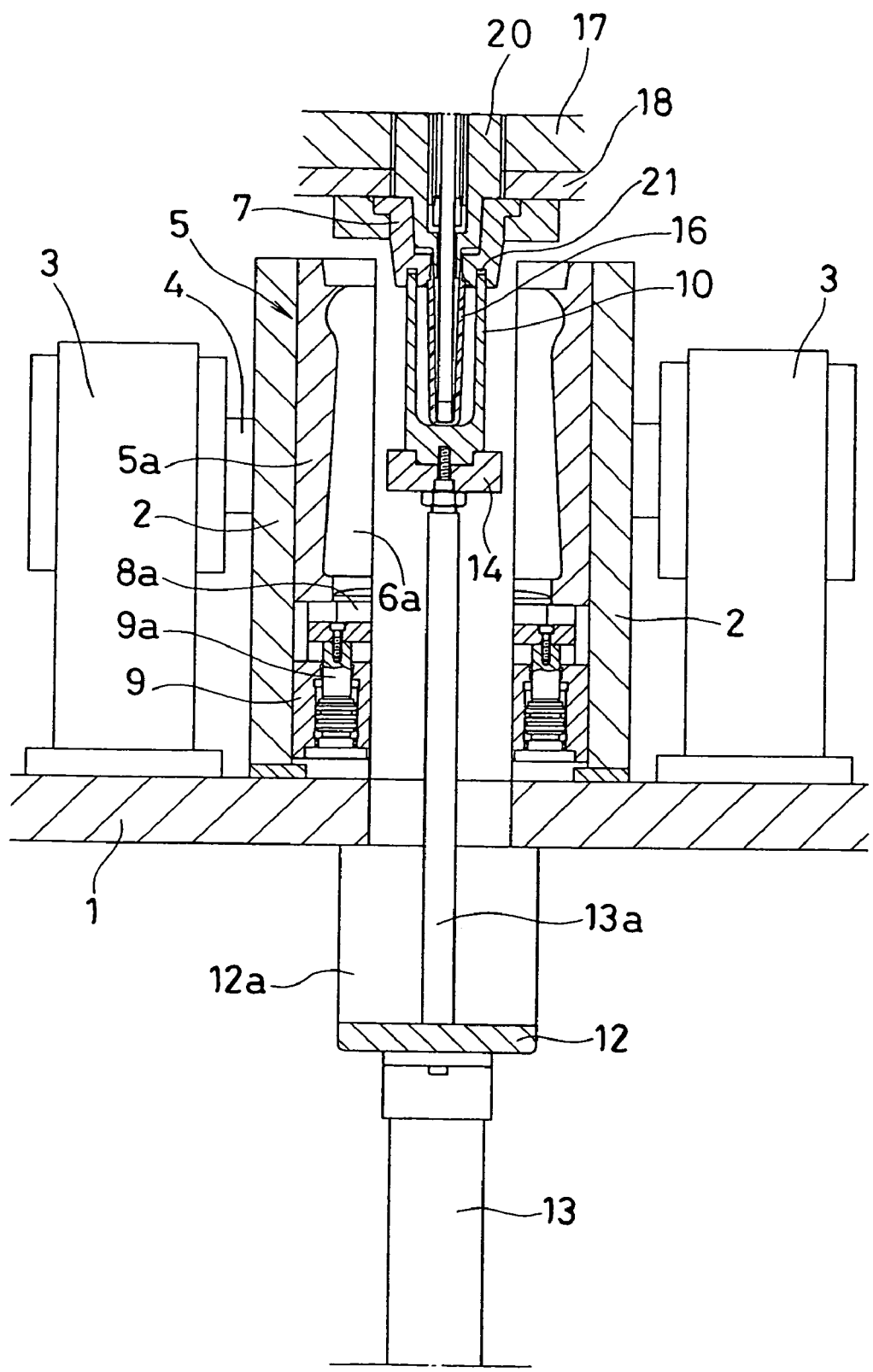
FIG. 3 is a sectional side view of the mold device when the pre-blow mold is being closed.
Figure 4:
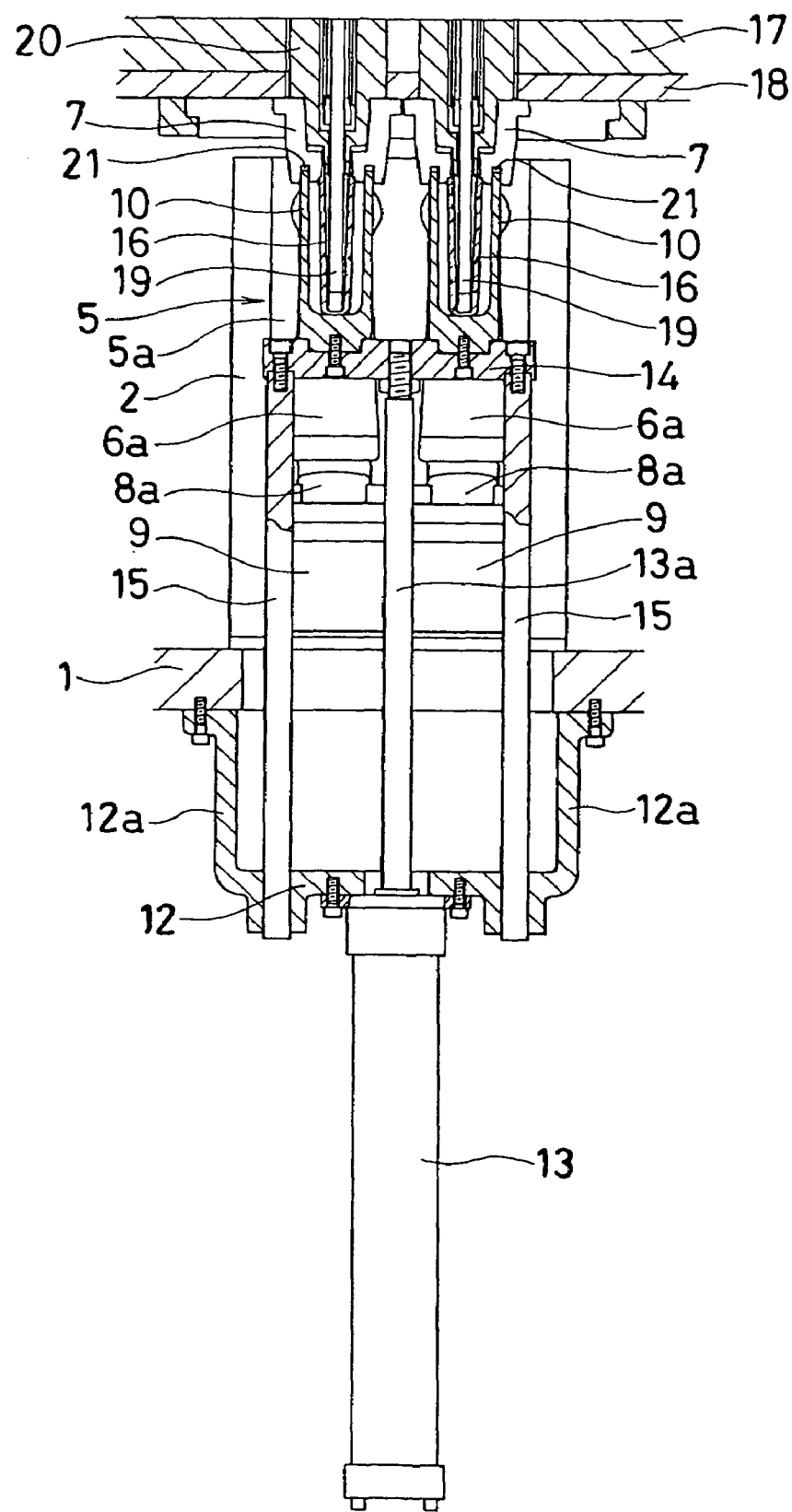
FIG. 4 is a sectional front view of the mold device in FIG. 3.

After the inserting action of the blow core 20 and the stretch rod 19 or simultaneously, as shown in FIG. 3 and FIG. 4, the lifting cylinder 13 of the lifting device 11 extends, and the extension of the piston rod 13a lifts up the pre-blow mold 10, which has been holding in the bed, with the base plate 14 into the area between the split molds 5a, 5a. The lifting action continues until the upper open end of the cylindrical pre-blow mold 10 is fitted into the annular groove 21 provided on the end surface of the neck mold 7, thereby the open end of the cylindrical member, which is covering the preform 16, is closed, and the lower end surface inside the annular groove 21 functions as an upper mold surface of the pre-blow mold 10.

Figure 5:
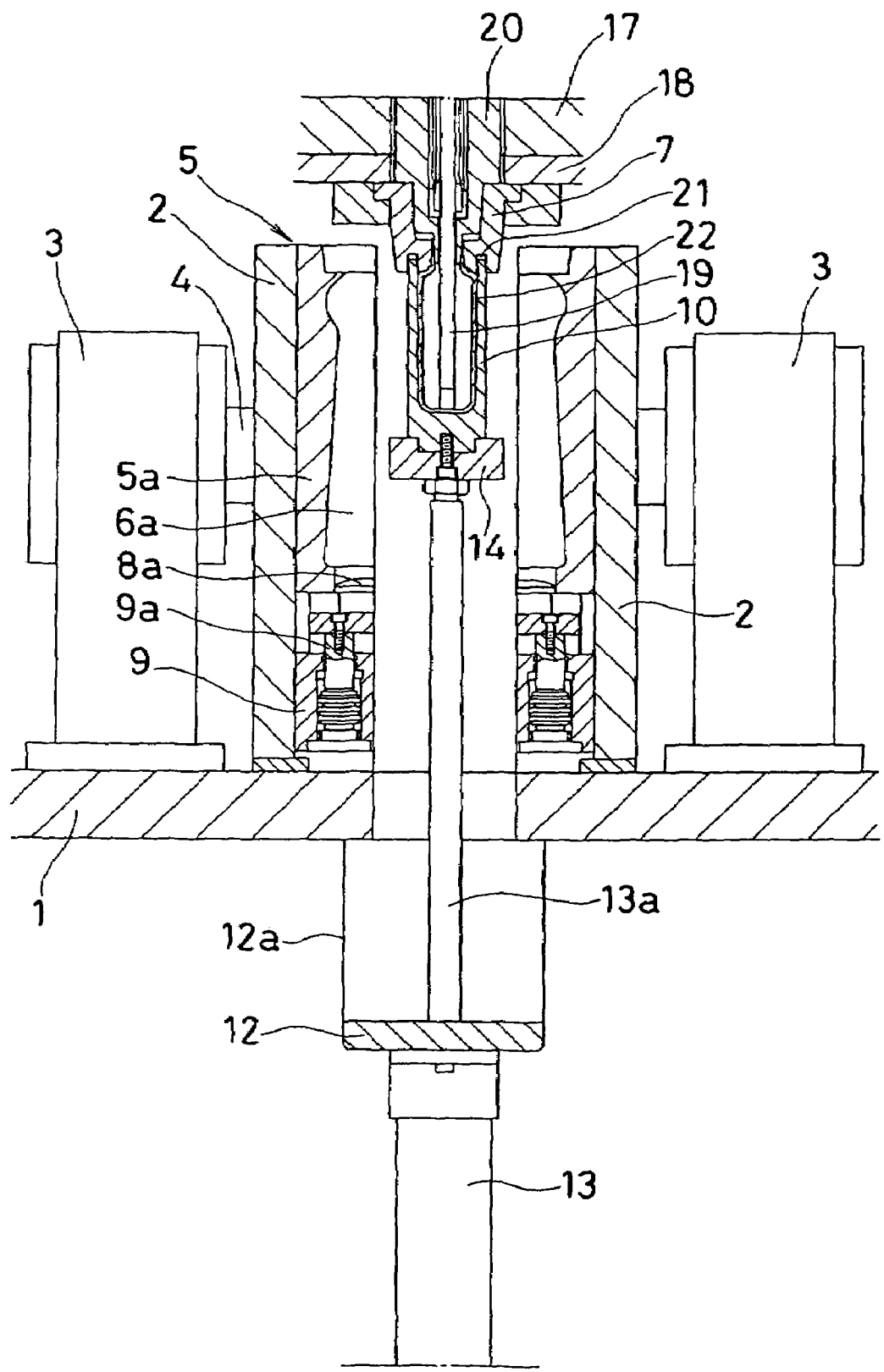
FIG. 5 is a sectional side view of the mold device in the pre-blow molding process.

During the closing state made by the neck mold 7 and the pre-blow mold 10 is maintained by the pressurized lifting cylinder 13, and air is blown from the blow core 20 into the preform 16. As shown in FIG. 5, the preform 16 expands and fills the whole cylindrical member being closed with the neck mold 7, then the preform 16 is pre-blow molded into a preliminary article 22, having a smaller wall thickness than the preform 16. The air inside the cylindrical member is replaced with the expansion of the preform and flows out from the clearance in the annular groove 21.

After pre-blow molding is finished as shown in FIG. 5, the piston rod 13a of the lifting cylinder 13 is withdrawn in order to move the pre-blow mold 10 down with the base plate 14 to the original position under the main blow mold 5. Accordingly, the pre-blow mold 10 is separated from the neck mold 7 by moving away, and preliminary article 22, having no parting line on its body portion, is placed between the split molds 5a, 5a with being retained by the neck mold 7.

Figure 6:
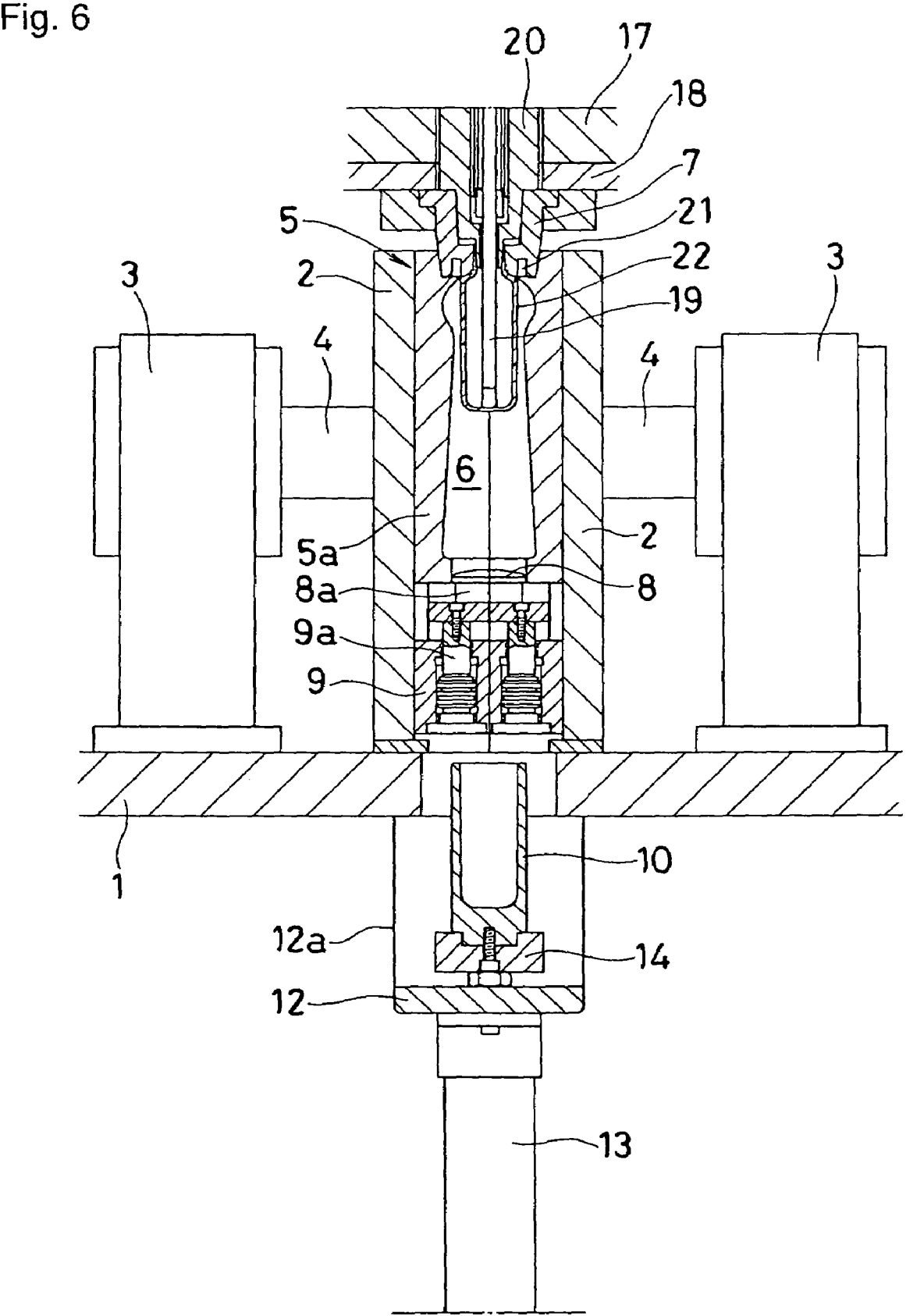
FIG. 6 is a sectional side view of the mold device when the main blow mold is being closed.
Figure 7:
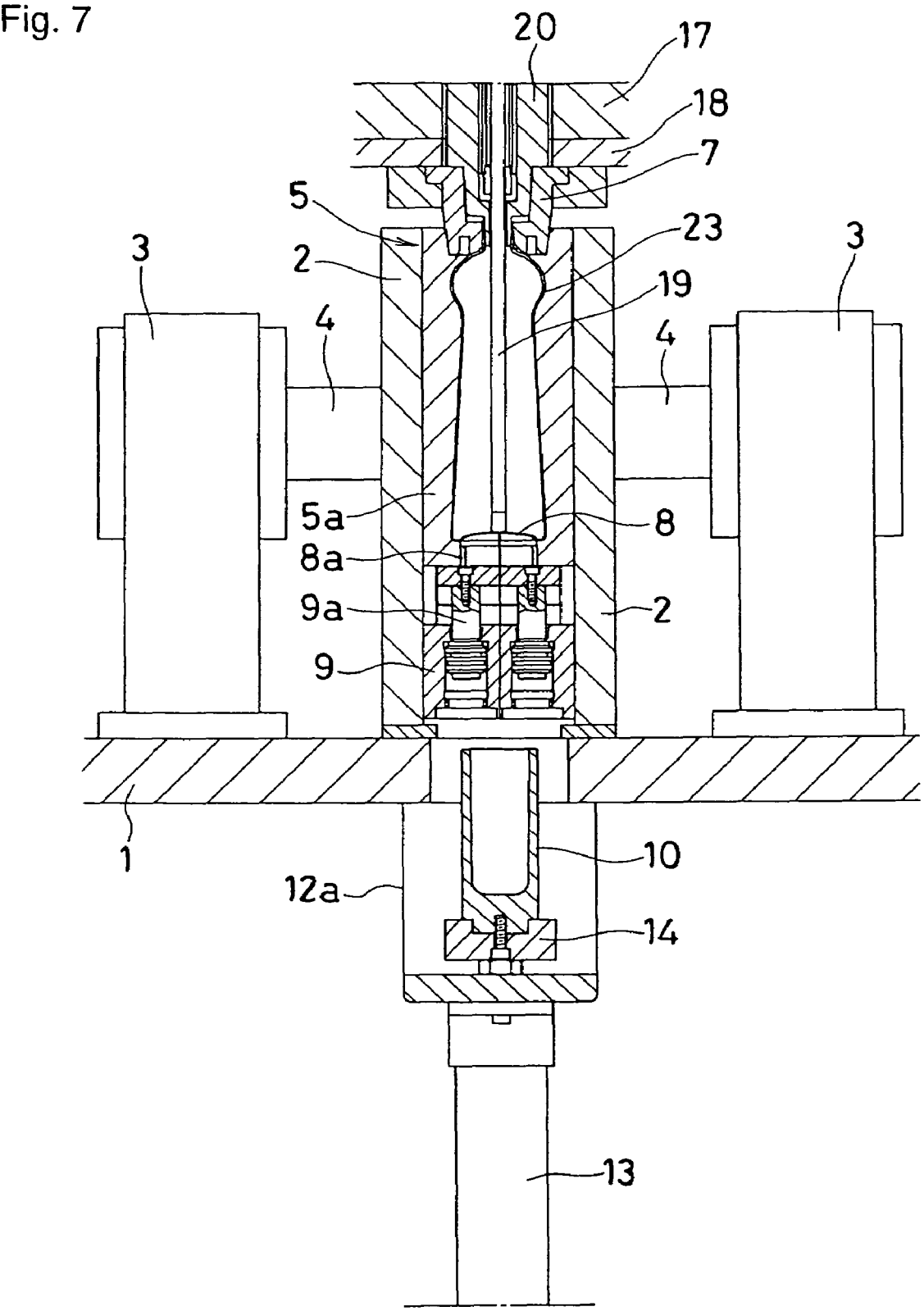
FIG. 7 is a sectional side view of the mold device in the main blow molding process.

As the pre-blow mold 10 gets back to its original position, the mold clamping devices move the platens 2, 2 forward with the split molds 5a, 5a, and the main blow mold is closed from both sides of the preliminary article 22, as shown in FIG. 6. This closing action fits the sides of the neck mold 7 and the split mold 5a, 5a, the cavity 6 is formed in the main blow mold 5, and the preliminary article 22 is placed in the upper center of the cavity 6.

After the closing and clamping of the main blow mold 5 is completed, the stretch rod 19 extends and stretches the preliminary article 22 towards the bottom of the cavity 6. At almost the same time, air is blown from the blow core 20 into the preliminary article 22, and the preliminary article 22 is stretched and expanded to fill the whole cavity 6 and formed to the bottle 23. After the stretch and expansion, the lifting cylinders 9, 9 move the split bottom molds 8a, 8a upward simultaneously and push the bottom molds 8a, 8a into the bottom portion of the cavity 6 to form a bottom mold 8, which forms the bottom of the bottle 23 concave. The bottom mold 8 can be pushed up with closing of the main blow mold 5 to form the convex bottom in the bottom portion of the cavity 6.

After the main blow molding of the bottle 23 is finished, both of the lifting cylinders 9, 9 move downward, pull the split bottom molds 8a, 8a out from the bottom portion of the cavity 6, and put the bottom mold 8 under the bottom portion of the sprit molds 5a, 5a. Then, the blow core 20 and the stretch rod 19 are pulled out upwardly from the neck mold 7. Subsequently, the mold clamping device 3, 3 moves the platens 2, 2, with the split molds 5a, 5a backward, and then the main blow mold 5 is opened. After that, the neck mold 7, retaining the bottle 23, moves up with the upward movement of the support platen 17, and the neck mold 7 is transferred to another area by the movement of the transfer platen 18. The following neck mold 7, retaining a new preform 16, is placed above the opened main blow mold 5 by this movement of the transfer platen 5.

The invention claimed is:

1. A mold device having a combination of molds for stretch blow molding, comprising;

a pair of platens facing towards each other attached to a mold clamping device on a bed and being movable advance and retreat;

a main blow mold separated into split molds and installed inside of said platens;

a lifting device placed vertically under said main blow mold and in said bed;

a pre-blow mold connected to said lifting device and movable in and out from the area between a pair of said split molds;

a neck mold located above said main blow mold so as to close said pre-blow mold and said main blow mold respectively;

a blow core being fitted into said neck mold; and a stretch rod inserted through said blow core; wherein said pre-blow mold comprises a cylindrical member having an open end on the upper portion which close said neck mold at an end surface of the neck mold, and a bottom mold for said main blow mold is separated into a pair of split bottom molds, and said split bottom molds are attached to lifting cylinders located under and said bottom mold is movable into and away from the bottom of a cavity.

2. The mold device having a combination of molds for stretch blow molding according to claim 1, wherein said neck mold comprises an annular groove provided on the end surface of said neck mold and said open end of pre-blow mold is to be fitted into said annular groove, and the end surface of said neck mold inside said annular groove forms the upper mold surface of said pre-blow mold.

3. The mold device having a combination of molds for stretch blow molding according to claim 1, wherein said main blow mold comprises a plurality of cavities placed in parallel, and said pre-blow molds, comprising same numbers of the cylindrical members as said neck molds so as to close each of said cavities respectively, are fixed in parallel on a base plate, which is tied to the upper end of a piston rod of said lifting device, and movable in and out of the area between said split molds of said main blow mold.

4. The mold device having a combination of molds for stretch blow molding according to claim 2, wherein said main blow mold comprises a plurality of cavities placed in parallel, and said pre-blow molds, comprising same numbers of the cylindrical members as said neck molds so as to close each of said cavities respectively, are fixed in parallel on a base plate, which is tied to the upper end of a piston rod of said lifting device, and movable in and out of the area between said split molds of said main blow mold.

* * * * *